March 29, 1932. A. W. KINGSTON 1,851,912
CINEMATOGRAPH CAMERA AND PROJECTOR
Filed Oct. 24, 1930 3 Sheets-Sheet 1
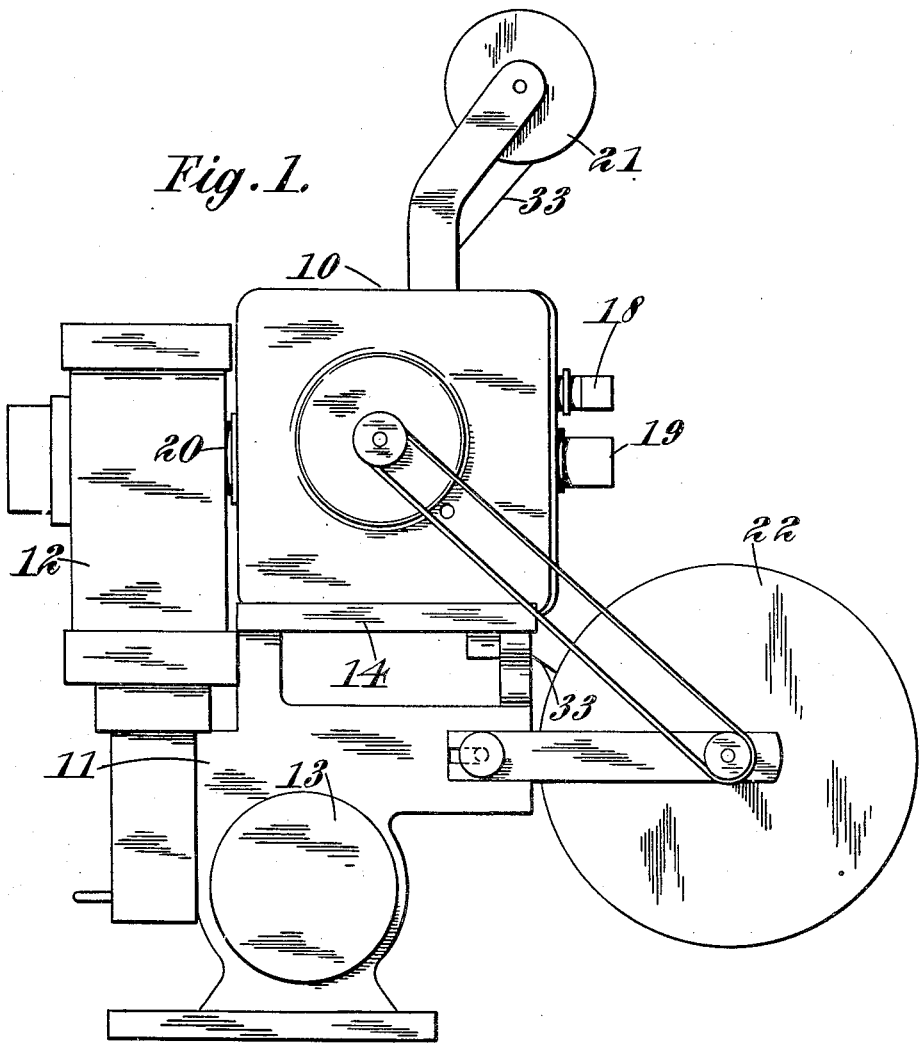

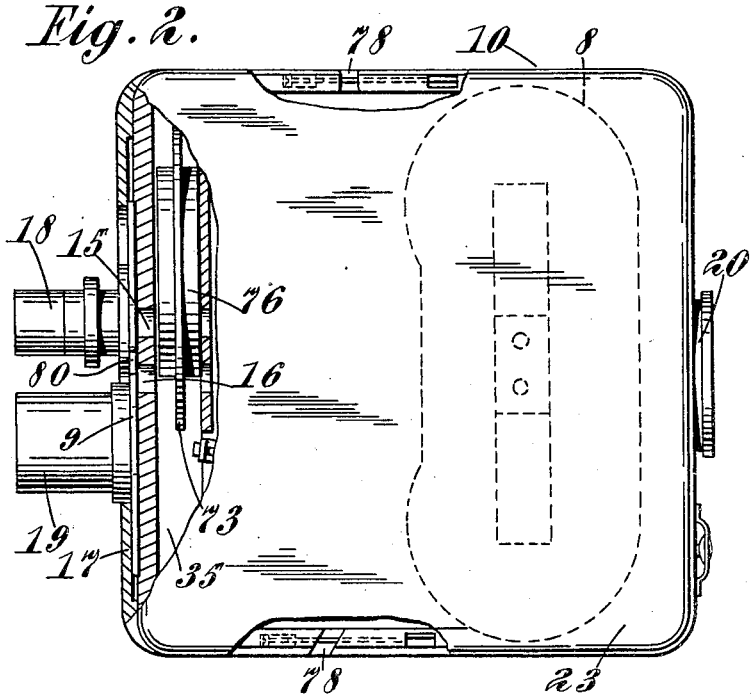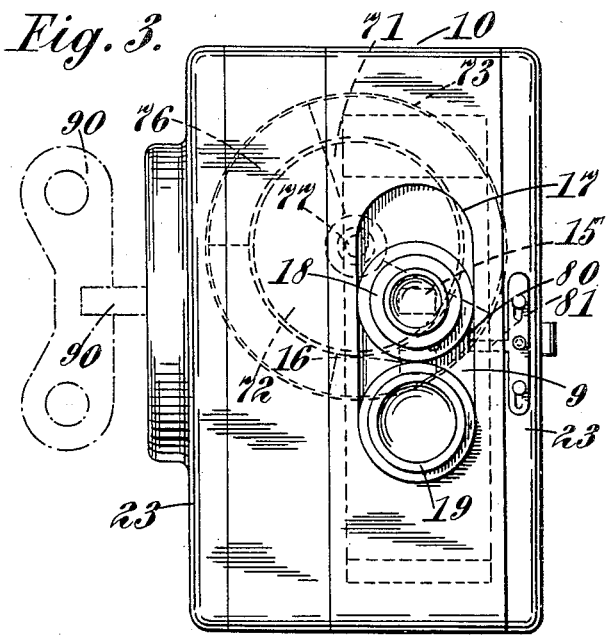

March 29, 1932.   A. W. KINGSTON   1,851,912
CINEMATOGRAPH CAMERA AND PROJECTOR
Filed Oct. 24, 1930   3 Sheets-Sheet 3
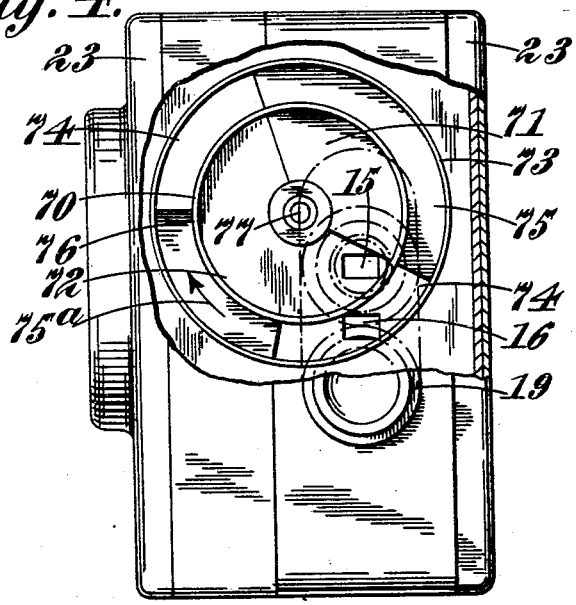
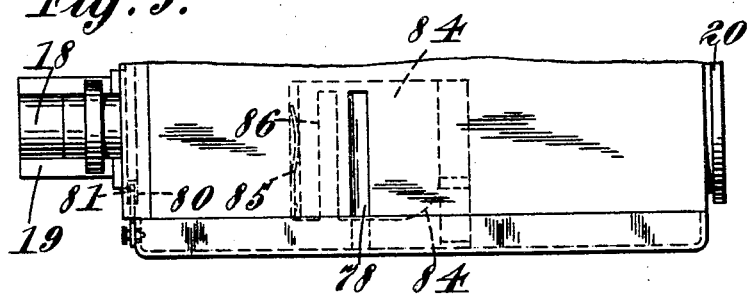
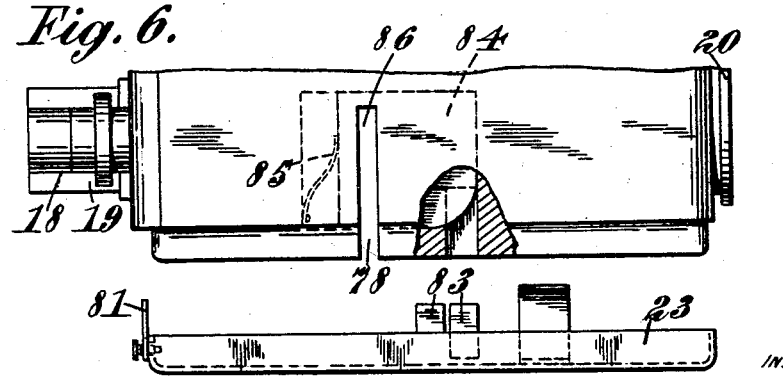
INVENTOR
Arthur W. Kingston,
By Watson, Coit, Morse & Grindle
Attys Patented Mar. 29, 1932

1,851,912

UNITED STATES PATENT OFFICE

ARTHUR WILLIAM KINGSTON, OF LONDON, ENGLAND, ASSIGNOR TO SPICERS LIMITED, OF LONDON, ENGLAND, A BRITISH COMPANY

CINEMATOGRAPH CAMERA AND PROJECTOR

Application filed October 24, 1930, Serial No. 490,984, and in Great Britain December 7, 1929.

This invention consists of improvements in or relating to cameras and projectors and particularly that type of cinematograph camera which is adapted to form a projector for cinematograph transparencies when used in conjunction with an illuminating system.

The optical conditions during taking and during projection differ in various ways. For example, in taking photographs the lens is preferably corrected for spherical aberration, chromatic aberration, etc., and it is well known that such photographic lenses do not allow the maximum of light to pass therethrough. On the other hand, the lens used for projection, (i. e. between the film and the screen) is not necessarily a photographic lens, but a lens appropriate to projection. In particular it is one which allows the maximum of light to pass therethrough.

Again, the shutter conditions during taking and projection may be different not only in the periods of illumination and obturation but also in the frequency of change from illumination to obturation: thus during taking, it may be desirable to give each film section the maximum time of exposure while the film is still, but during projection it may well be advantageous to have two or more periods of illumination alternating with two or more periods of obturation for each picture.

One object of this invention is to provide an apparatus which facilitates these changes of optical conditions, and another object is to ensure compactness and simplicity which will render the apparatus fool-proof.

This invention provides a cinematograph camera of the type in which there are provided two apertures in the camera portion, one for use in taking the picture and the other for use in projecting it and a rotating shutter so formed that one aperture only is used during taking and the other aperture only is used during projection.

According to the invention the camera is provided with a sliding lens holder, carrying two lens systems, one for taking and the other for projection, so arranged that they may be brought alternatively into coincidence with their appropriate apertures.

The lens holder may form a light stop so arranged that the projection aperture is covered by the stop while the taking means is in coincidence with the taking aperture, and the taking aperture is covered by the stop when the projection lens is in coincidence with the projection apparatus.

According to yet another feature of the invention the lens holder may be slidably mounted in guideways on the front of the camera.

According to a further feature of the invention there may be provided means, for example a sliding stop device, to ensure that the loading door of the camera cannot be closed until the taking lens has been brought into coincidence with its appropriate aperture.

The shutter for use in the camera according to this invention may be provided with a slot for taking of a circumferential length which differs from that of the slot or slots in the portion of the shutter which is arranged to function during the projection of the pictures.

Thus, the composite rotating shutter may comprise two or more slots in tandem alternating with obturator portions for the purpose of reducing flicker.

One embodiment of the apparatus will now be described by way of example with reference to the accompanying drawings, in which:—

Figure 1 illustrates a side elevation of the combined camera and projector,

Figure 2 illustrates a side elevation partly broken away of the camera body,

Figure 3 illustrates a front elevation of the camera body,

Figure 4 is a front elevation partly in section of the camera body, and

Figures 5 and 6 are part plan views of the camera body.

Like reference numerals indicate like parts throughout the drawings.

The camera body comprises a rectangular metal frame 10 having detachable sides 23 and having also a septum 35 parallel to these sides and dividing the camera body into two chambers of unequal width.

The camera body is adapted to be used as a hand camera, but is readily attachable to a projector stand. The projector stand comprises a foot plate and a framework 11 bearing a projector lamp 12. Near the bottom of the framework 11 is a cylindrical orifice 13 in which can be disposed an electric motor for driving the cinematograph gear during projection. Above the motor and in front of the lamp is a horizontal platform 14 having a screw (not shown) by means of which the camera body is secured to the stand.

The front wall of the camera body has two rectangular apertures 15, 16 which are about $\frac{7}{16}$ inch in width and $\frac{7}{16}$ inch in height, and which are located one above the other and separated by a distance of about $\frac{1}{4}$ inch. The upper of these apertures 15 is to be used for taking and the lower aperture 16 for projection.

In front of the camera body is placed a vertical brass guideway 17 in which slides a vertical plate 9 having two circular perforations and carrying two lenses 18, 19.

The upper lens 18 is for taking photographs and the lens has all the usual corrections necessary for that purpose e. g. for spherical aberration and for chromatic aberration, etc. The lower lens 19 is used for projection and its characteristic is that it allows the maximum amount of light to pass therethrough. The sliding arrangement is such that the upper lens 18 is brought into coincidence with the upper aperture 15 for taking photographs and the lower lens 19 is moved into coincidence with the lower aperture 16 for projection.

Unless the taking lens 18 is in coincidence with the taking aperture 15 the side cover 23 of the camera body cannot be fitted on owing to the fact that the socket 80 on the sliding lens carrier 9 will not be in a position to receive the projection 81 on the side cover 23, (see Figures 5 and 6). This ensures that the proper lens is in position when taking photographs. When the projection lens is opposite the projection aperture it will be impossible to fit the side cover on to the camera; as in this case the socket 80 will be unable to receive the projection 81. This, however, is no disadvantage as it will be understood that it is not necessary to exclude light from the body of the camera during projection, and hence there is no need for the side cover to be placed in position. A hinged baffle plate (not shown) may be provided on the projector stand in order to prevent extraneous light from reaching the screen or spectators.

In the back wall of the camera body is a round orifice 20 which is adjacent to the condenser of the projection lamp 12. This orifice 20 is provided with a screw or sliding cover (not shown) which is adapted to close the orifice in a light-tight manner during taking of the film and which is removed when the apparatus is to be used for projection purposes.

Turning now to the cinematograph mechanism the film holders for taking and projection are different. For taking, a twin film magazine 8 is employed and this is held in position by suitable locating sheaths (not shown) which project laterally from the septum 35 in the camera body. During projection, on the other hand, the film 33 is on removable feed and take-up drums outside the camera body, the supply spool 21 being above the camera body and the take-up spool 22 being below.

In taking and in projection the film passes over the usual sprocket wheels which engage the perforations in the film and lead it past the gate of the camera. The back of the gate has one aperture only, because no aperture is required for taking the film.

The shutter comprises two annular concentric portions. The annular portion 70 which is used for taking, has an outer diameter of about 2 inches and an inner diameter of about $\frac{3}{4}$ inch. The annular space $\frac{5}{8}$ inch in width is divided up into about 120° obturator 71 and about 240° slot 72.

The outer annulus 73 of the shutter, which is about $\frac{1}{2}$ inch wide, is divided by an upstanding rim 76 from the inner annulus, and it is made up of two slots 74 and two opaque portions 75, 75a. The opaque portion 75 which comes into operation during the shifting of the film occupies about 115° angle and the other opaque portion 75a occupies about 90° and the two slots 74 are about 80° each giving two exposures to each picture. The reason for the provision of two slots is the usual one, viz. to avoid flicker owing to infrequent change from light to dark. The spindle 77 of the shutter is positively driven.

Referring now to Figures 5 and 6 of the drawings, it will be appreciated that during taking it is essential to prevent light from penetrating into the camera through the slots 78 in the upper and lower surface of the camera body which, during projection permit of the passage of the film from the upper spool 21 into the camera body and from the camera body to the lower spool 22, respectively. Each side of the detachable cover 23 is provided with a catch 83, which when the cover is placed in position engages the corner of the plate 84 and forces it to the left against the action of the spring 85 and thus causes it to obstruct the slot 78. On removal of the cover 23 the plate 84 springs back into its normal position in which the slot 86 in the plate lies opposite the slot 78 in the camera body thus permitting the passage of the film through this slot from the supply spool 21.

During taking and projection the mechanism of the camera may be driven by hand, but preferably the camera body includes clock work, the winding handle of which is shown at 90, for driving the mechanism during taking, and the projector stand contains an electric motor located within the orifice 13 for driving the mechanism during the projection.

I claim:—

1. A cinematograph camera, which comprises in combination, a projector, a camera portion provided with two apertures one for use in taking the picture and the other for use in projecting it, a rotating shutter so formed that one aperture only is used during taking and the other aperture only during projection, and a sliding lens holder carrying two lens systems, one for taking and the other for projection, which are adapted to be brought alternatively into coincidence with their respective apertures.

2. A cinematograph camera, which comprises in combination, a projector, a camera portion provided with two apertures, one for use in taking the picture and the other for use in projecting it, a rotating shutter comprising two concentric slotted sections, one adapted to co-operate with the aperture used in taking the picture and the other adapted to co-operate with the aperture used in projecting it, and a sliding lens holder carrying two lens systems, one for taking and the other for projection, which are adapted to be brought alternatively into coincidence with their respective apertures.

3. A cinematograph camera, which comprises in combination a projector, a camera portion provided with two apertures one for use in taking the picture and the other for use in projecting it, a rotating shutter so formed that one aperture only is used during taking and the other aperture only during projection, and a sliding lens holder carrying two lens systems, one for taking and the other for projection, said lens holder forming a light stop adapted to cover the projection aperture when the taking lens is in coincidence with the taking aperture, and the taking aperture when the projection lens is in coincidence with the projection aperture.

4. A cinematograph camera, which comprises in combination a projector, a camera portion provided with two apertures, one for use in taking the picture and the other for use in projecting it, a rotating shutter comprising two concentric slotted sections, one adapted to co-operate with the aperture used in taking the picture and the other adapted to co-operate with the aperture used in projecting it, and a sliding lens holder carrying two lens systems, one for taking and the other for projection, said lens holder forming a light stop adapted to cover the projection aperture when the taking lens is in coincidence with the taking aperture, and the taking aperture when the projection lens is in coincidence with the projection aperture.

5. A cinematograph camera, which comprises in combination a projector, a camera portion provided with two apertures, one for use in taking the picture and the other for use in projecting it, a rotating shutter so formed that one aperture only is used during taking and the other aperture only during projection, and a lens holder slidably mounted in guideways on the front of the camera and carrying two lens systems, one for taking and the other for projection, which are adapted to be brought alternatively into coincidence with their respective apertures.

6. A cinematograph camera, which comprises in combination a projector, a camera portion provided with two apertures, one for use in taking the picture and the other for use in projecting it, a rotating shutter comprising two concentric slotted sections, one adapted to co-operate with the aperture used in taking the picture and the other adapted to co-operate with the aperture used in projecting it, and a lens holder slidably mounted in guideways on the front of the camera and carrying two lens systems, one for taking and the other for projection, which are adapted to be brought alternatively into coincidence with their respective apertures.

7. A cinematograph camera, which comprises in combination a projector, a camera portion provided with a loading door and having two apertures, one for use in taking the picture and the other for use in projecting it, a rotating shutter so formed that one aperture only is used during taking and the other aperture only during projection, a sliding lens holder carrying two lens systems, one for taking and the other for projection, which are adapted to be brought alternatively into coincidence with their respective apertures, and a sliding stop device adapted to prevent closure of the loading door of the camera until the taking lens has been brought into coincidence with its appropriate aperture.

8. A cinematograph camera, which comprises in combination a projector, a camera portion provided with a loading door and having two apertures, one for use in taking the picture and the other for use in projecting it, a rotating shutter comprising two concentric slotted sections, one adapted to co-operate with the aperture used in taking the picture and the other adapted to co-operate with the aperture used in projecting it, a sliding lens holder carrying two lens systems, one for taking and the other for projection, which are adapted to be brought alternatively into coincidence with their respective apertures, and a sliding stop device adapted to prevent closure of the loading door of the camera until the taking lens has been brought into coincidence with its appropriate aperture.

9. A cinematograph camera, which comprises in combination a projector, a camera portion provided with two apertures, one for use in taking the picture and the other for use in projecting it, a rotating shutter comprising two concentric sections, provided with slots of different circumferential length, one adapted to co-operate with the aperture used in taking the picture and the other adapted to co-operate with the aperture used in projecting it, and a lens holder slidably mounted in guideways on the front of the camera and carrying two lens systems, one for taking and the other for projection, which are adapted to be brought alternatively into coincidence with their respective apertures.

10. A cinematograph camera, which comprises in combination a projector, a camera portion provided with two apertures, one for use in taking the picture and the other for use in projecting it, a rotating shutter comprising two concentric sections, each having two or more slots alternating with obturator portions, one of said sections being adapted to co-operate with the aperture used in taking the picture and the other adapted to co-operate with the aperture used in projecting it, and a lens holder slidably mounted in guideways on the front of the camera and carrying two lens systems, one for taking and the other for projection, which are adapted to be brought alternatively into coincidence with their respective apertures.

In testimony whereof I affix my signature.

ARTHUR WILLIAM KINGSTON.